United States Patent [19]

Meredith

[11] Patent Number: 5,225,076
[45] Date of Patent: Jul. 6, 1993

[54] PURIFIED COFFEE AND ICE WATER DISPENSER

[76] Inventor: Peter T. Meredith, 584 Deleware Ave., R.R. #1, Fort Erie, Ontario, Canada, L2A 5M4

[21] Appl. No.: 763,536

[22] Filed: Sep. 23, 1991

[51] Int. Cl.⁵ .............................................. B01D 35/02
[52] U.S. Cl. .................. 210/181; 210/416.3; 210/474; 210/477; 210/482; 99/295; 99/305
[58] Field of Search ............... 210/175, 176, 181, 187, 210/416.3, 474, 477, 482; 99/295, 305

[56] References Cited

U.S. PATENT DOCUMENTS

| | | | |
|---|---|---|---|
| 4,752,389 | 6/1988 | Burrows | 210/181 |
| 4,880,535 | 11/1989 | Burrows | 210/181 |
| 4,957,624 | 9/1990 | Perania | 210/181 |

Primary Examiner—Robert A. Dawson
Assistant Examiner—W. L. Millard
Attorney, Agent, or Firm—Eugene J. A. Gierczak

[57] ABSTRACT

The "PURIFIED COFFEE AND ICE WATER DISPENSER" replaces the standard kitchen sink taps. The tap water is directed to a flow director at the base of the spout which adjusts to allow the flow to either run trough a water filter or through the spout directly into the sink. When the tap water is directed through the water filter it fills a pre-heated water reservoir depending on the direction the spout is moved, and is drawn by opening the hot water or cold water spout. Coffee is drawn by adjusting a regulator valve which sends the hot water through a coffee filter and out the hot water spout. The reservoirs are cooled and heated elecrically with thermostats.

15 Claims, 4 Drawing Sheets

PURIFIED COFFEE AND ICE WATER DISPENSER

SUMMARY

"This invention relates to filtered water electrical heating and cooling system that replaces the standard kitchen faucet assembly. The existing method of filtered kitchen tap water only allows for normal temperature water that must be heated or cooled by stove or fridge.

This invention allows to draw filtered ice and hot water from an attractive sink unit for ice water, hot water, and coffee."

It is an aspect of this invention to provide a kitchen faucet dispensing unit comprising: a horizontally rotatable spout member moveable between a first position and a second position, said horizontal rotatable spout communicating with tap water; a cooling reservoir; a heating reservoir; a flow director associated with said horizontally rotatable spout member for: directing said tap water to said cooling reservoir when said horizontally rotatable spout is moved to said first position; directing tap water to said heating reservoir when said horizontally rotatable spout is moved to said second position; filter means disposed between said flow director and said reservoirs for filtering said tap water; structure for cooling said water in said cooling reservoir; structure for heating said water in said heating reservoir; a cold water dispensing valve communicating with said cooling reservoir for dispensing said water in said cooling reservoir; a hot water dispensing valve communicating with said heating reservoir for dispensing said water in said heating reservoir; a coffee filter drawer moveable between: an open position for receiving a coffee filter and coffee; and a closed position; said coffee filter drawer including coffee spout for dispensing coffee; and a coffee selector valve for directing water from said heating reservoir through said filter and said coffee to said coffee spout.

"In drawings which illustrate the embodiment of the invention.

Figure 1:
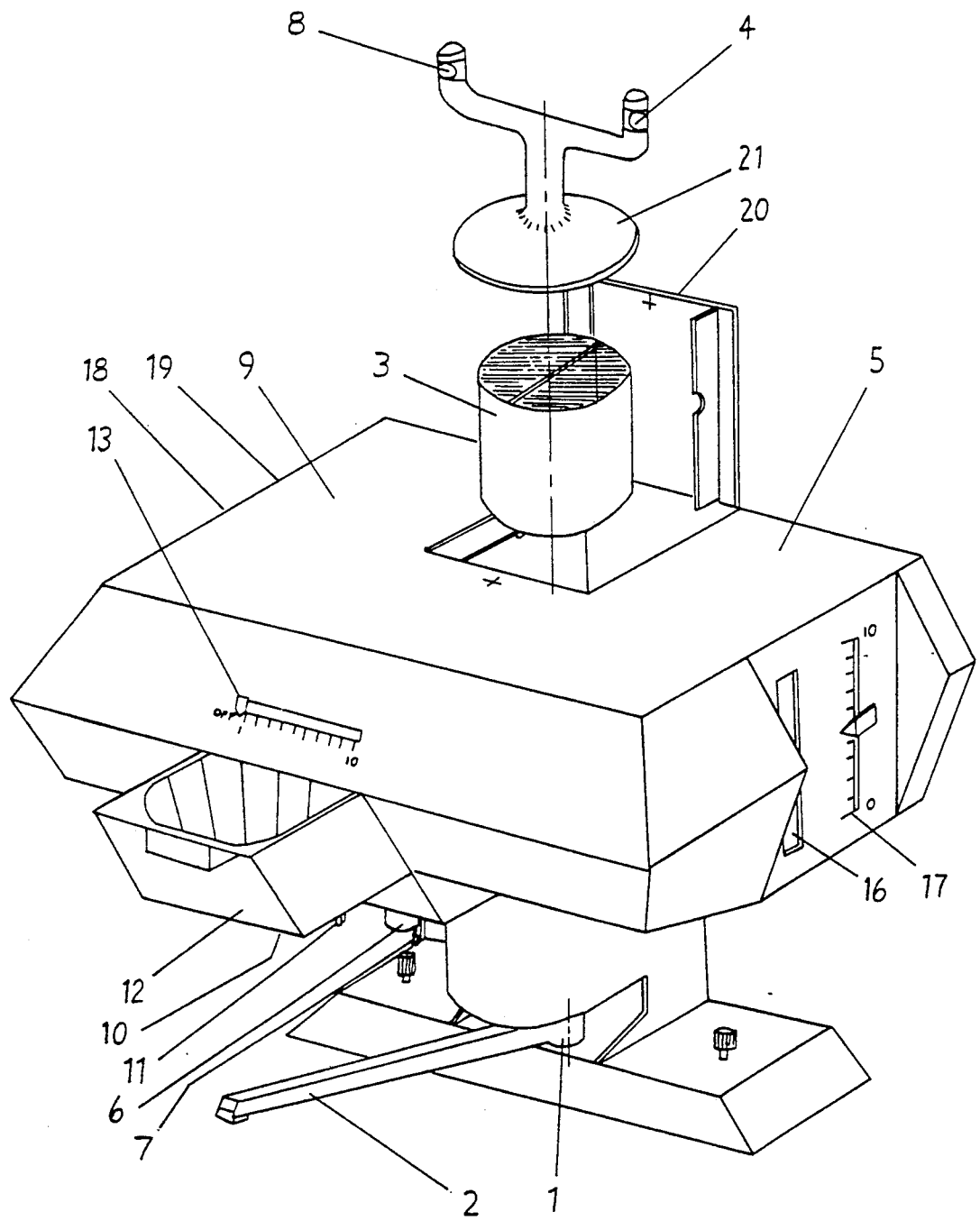
FIG. 1 Is an isometeric view of the described embodiment.
Figure 2:
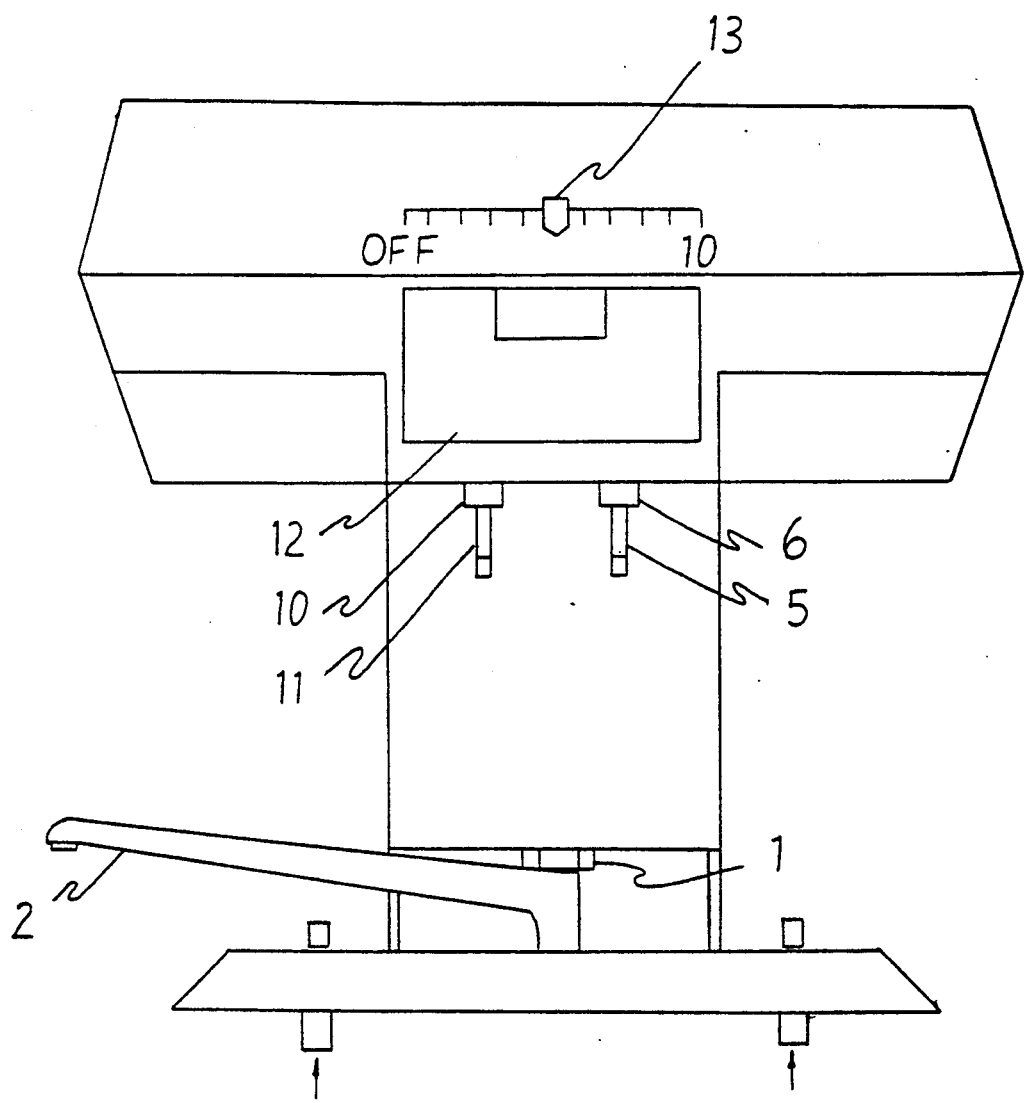
FIG. 2 Is a front view of this embodiment.
Figure 3:
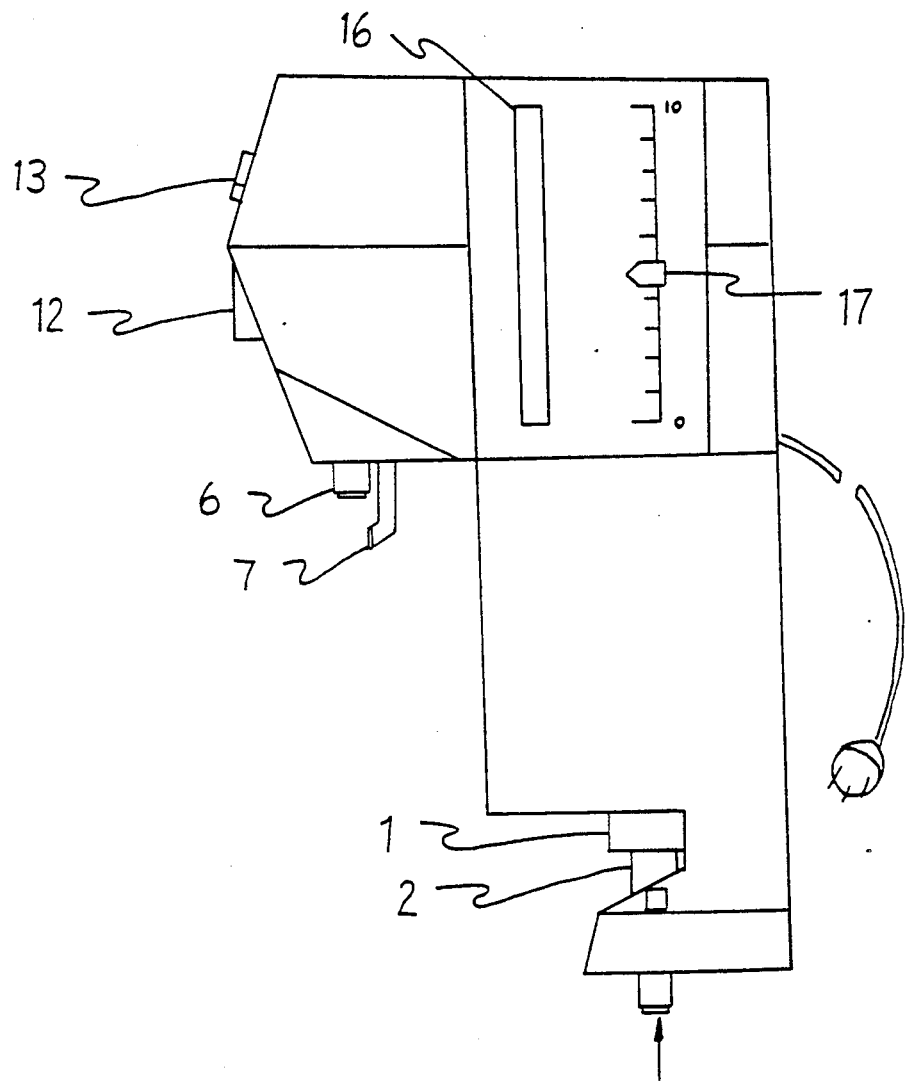
FIG. 3 Is a right side view of this embodiment.
Figure 4:
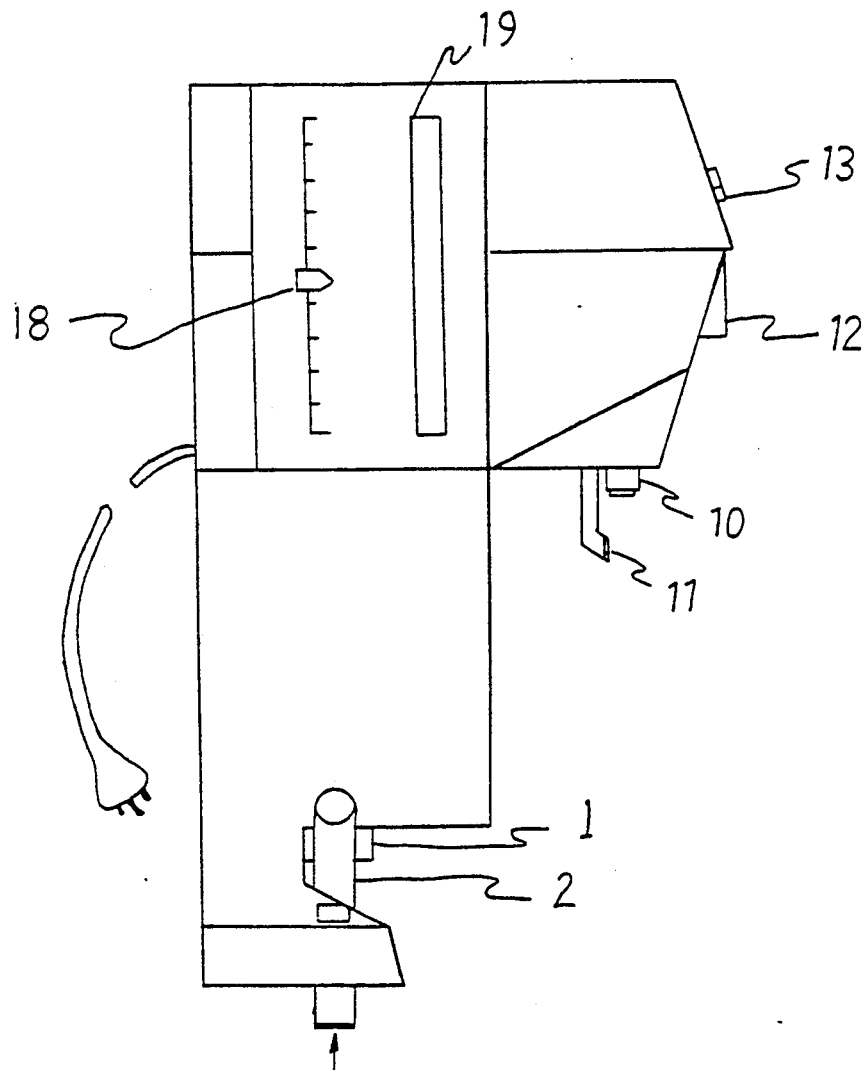
FIG. 4 Is a left side view of this embodiment.

The apparatus illustrated is installed in replacement of the kitchen sink faucet assembly. The tap water is sent through a flow director 1 located at the base of the spout 2 which when swung as far right as possible sends the water up and through a replacement filter 3 then lifts ball valve 4 and into the cooling reservoir 5 the spout 2 is horizontally rotatable between a first position whereby the spout is flung as far to the right as possible, and a second position whereby the spout 2 is flung as far as possible to the left, as viewed in FIG. 1. The flow director 1 is associated with the spout 2 and located at the base of the spout 2.

When ice water is required a container is placed under spout 6 and is depressed against spout valve 7.

When hot water is required the spout is swung as far left as possible the water is directed through flow valve 1 and filter 3 lifting the ball valve 8 and into heating reservoir 9.

When hot water is required a container is placed under spout 10 and depressed against spout valve 11.

When coffee is required the coffee filter drawer 12 is pulled open filter and coffee is placed into drawer then closed. By sliding the coffee selection to the desired number of cups valve 13 re-routes the hot water from the reservoir and through the filter drawer and out the spout 10 after spout valve 11 is depressed.

Fill window 16 and thermostat 17 allows to regulate fulness and cold water temperature.

Fill window 18 and thermostat 19 allows to regulate fullness and hot water temperature.

The filter is replaced by lifting door 20 and filter cap 21.

Filter cap 21 is locked in place when door 20 is closed and locked.

The embodiment can be constructed of stainless steel, polymer or polyvinyl chloride. The components required for cooling and heating would be pre-engineered assembled modules:

The unit is installed by inserting the assembly into the standard eight inch centered holes in the kitchen sink and coupling the cold and hot water inlets as done when installing standard faucets."

I claim:

1. In a kitchen faucet dispensing unit for communication with tap water comprising:
   a. a horizontally rotatable spout member moveable between a first position and a second position said horizontal rotatable spout communicating with said tap water;
   b. a cooling reservoir;
   c. a heating reservoir;
   d. a flow director associated with said horizontally rotatable spout member for:
      i. directing said tap water to said cooling reservoir when said horizontally rotatable spout is moved to said first position:
      ii. directing tap water to said heating reservoir when said horizontally rotatable spout is moved to said second position:
   e. filter means disposed between said flow director and said reservoirs for filtering said tap water:
   f. means for cooling said water in said cooling reservoir:
   g. means for heating said water in said heating reservoir;
   h. a cold water dispensing valve communicating with said cooling reservoir for dispensing said water from cooling reservoir;
   i. a hot water dispensing valve communicating with said heating reservoir for dispensing said water from said heating reservoir;
   j. a coffee filter drawer moveable between:
      i. an open position for receiving a coffee filter and coffee; and
      ii. a closed position:
      said coffee filter drawer including a coffee spout for dispensing brewed coffee; and
   k. a coffee selector valve for directing water from said heating reservoir through said filter and said coffee to said coffee spout.

2. In a kitchen faucet dispensing unit as claimed in claim 1, further including a cold water thermostat to regulate the temperature of said water in said cooling reservoir.

3. In a kitchen faucet dispensing unit as claimed in claim 2 further including a cold water window to view the level of water in said cooling reservoir.

4. In a kitchen faucet dispensing unit as claimed in claim 3 further including a hot water thermostat to regulate the temperature of said water in said heating reservoir.

5. In a kitchen faucet dispensing unit as claimed in claim 4 further including a hot water window to view the level of water in said heating reservoir.

6. In a kitchen faucet dispensing unit as claimed in claim 5 wherein said coffee selector valve includes means to select the number of cups of coffee.

7. In a kitchen faucet dispensing unit as claimed in claim 6 which includes a filter cover moveable between an open position for replacing said filter and a closed position to prevent access to said filter.

8. In a kitchen faucet dispensing unit as claimed in claim 7 which includes a filter cap disposed between said filter and said reservoirs.

9. In a kitchen faucet dispensing as claimed in claim 8 wherein said filter cap includes a cold water ball valve and a hot water ball valve.

10. In a kitchen faucet dispensing unit as claimed in claim 9 wherein said cooling means comprises electrical means to cool said water in said cooling reservoir.

11. In a kitchen faucet dispensing unit as claimed in claim 10 wherein said cooling means comprises electrical means to cool said water in said cooling reservoir and to make ice.

12. In a kitchen faucet dispensing unit as claimed in claim 11 wherein said cooling means comprises dry ice.

13. In a kitchen faucet dispensing unit as claimed in claim 11 wherein said heating means comprises electrical means to heat water in said heating reservoir.

14. A kitchen faucet dispensing unit as claimed in claim 1 wherein said flow director directs:
   said tap water through said horizontally rotatable spout:
   b. said tap water to said cooling reservoir when said horizontally rotatable spout is moved to the right;
   c. directs said tap water to said heating reservoir when said horizontally rotatable spout is moved to the left.

15. In a kitchen faucet dispensing unit as claimed in claim 14 wherein said tap water comprises of hot water and cold water and wherein said flow director communicates with said cold water when said horizontally rotatable spout is moved to said right position, and wherein said flow director communicates with said hot water when said horizontally rotatable spout is moved to said left position.

* * * * *